(12) United States Patent
Chen et al.

(10) Patent No.: US 11,941,410 B2
(45) Date of Patent: Mar. 26, 2024

(54) BIOS PERFORMANCE MODE CONFIGURATION DEPLOYMENT

(71) Applicant: QUANTA COMPUTER INC., Taoyuan (TW)

(72) Inventors: Lung-Chih Chen, Taoyuan (TW); Tian-You Chen, Taoyuan (TW); Ting-Wei Chien, Taoyuan (TW); Chao-Kai Huang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 152 days.

(21) Appl. No.: 17/577,752

(22) Filed: Jan. 18, 2022

(65) Prior Publication Data

US 2023/0229453 A1    Jul. 20, 2023

(51) Int. Cl.
| | |
|---|---|
| *G06F 9/44* | (2018.01) |
| *G06F 3/0482* | (2013.01) |
| *G06F 9/4401* | (2018.01) |
| *G06F 9/445* | (2018.01) |
| *G06F 11/34* | (2006.01) |

(52) U.S. Cl.
CPC .......... *G06F 9/4406* (2013.01); *G06F 3/0482* (2013.01); *G06F 9/44505* (2013.01); *G06F 11/3466* (2013.01)

(58) Field of Classification Search
CPC ................ G06F 1/32; G06F 9/44; G06F 1/12
See application file for complete search history.

(56) References Cited

U.S. PATENT DOCUMENTS

| | | | |
|---|---|---|---|
| 9,128,729 B1 * | 9/2015 | Hung | .................... G06F 9/4451 |
| 9,542,201 B2 | 1/2017 | Jau et al. | |

(Continued)

FOREIGN PATENT DOCUMENTS

| | | |
|---|---|---|
| TW | 201610850 A | 3/2016 |
| TW | I537748 B | 6/2016 |
| TW | 201631498 A | 9/2016 |

OTHER PUBLICATIONS

TW Office Action for Application No. 111113415, dated Mar. 28, 2023, w/ First Office Action Summary.

(Continued)

*Primary Examiner* — Keshab R Pandey
(74) *Attorney, Agent, or Firm* — NIXON PEABODY LLP

(57) ABSTRACT

Systems and methods for generating, distributing, and using performance mode BIOS configurations are disclosed. Each performance mode BIOS configuration can be a unique set of BIOS setting values that have been established to optimize a particular performance parameter or set of performance parameters, such as boot speed or operating system installation speed. Based on a given hardware configuration and/or set of performance parameters, one or more performance mode BIOS configurations can be packaged and transferred to a memory of a BMC in the form of one or more configuration payloads. The BIOS Setup Utility can display all configuration payloads, such as listed by the type of performance mode (e.g., "Boot Speed Performance Mode" and "OS Installation Performance Mode"), that are available in the BMC memory and allow a user to overwrite the memory containing the current BIOS configuration with a selected configuration payload.

17 Claims, 6 Drawing Sheets

(56) References Cited

U.S. PATENT DOCUMENTS

| | | | |
|---|---|---|---|
| 2011/0225274 A1* | 9/2011 | Dvorkin | G06F 9/44505 709/222 |
| 2021/0067406 A1* | 3/2021 | Myers | G06F 11/3409 |
| 2021/0083934 A1 | 3/2021 | Yen et al. | |

OTHER PUBLICATIONS

TW Search Report for Application No. 111113415, dated Mar. 28, 2023, w/ First Office Action.

* cited by examiner

BIOS PERFORMANCE MODE CONFIGURATION DEPLOYMENT

TECHNICAL FIELD

The present disclosure relates to computing systems generally and more specifically to the operation of computer firmware, such as BIOS firmware.

BACKGROUND

Computing systems often make use of BIOS (Basic Input/Output System) firmware to handle various initialization processes when a system is booting up. Numerous BIOS settings can be changed and adjusted as needed, each of which can affect the computing system's boot up procedures. Generally, a default set of values for each BIOS setting is provided or saved into a computing system, allowing that computing system to reliably boot up. This default set of BIOS setting values can be established to be usable across different computing systems and different types of computing systems. While the default set of BIOS setting values is generally useable to reliably boot up a computing system, the default settings will generally not optimize various performance parameters, such as boot speed, operating system installation speed, energy usage, heat generation, and the like. Further, the default BIOS setting values may no longer be suitable when the computing system's hardware configuration has changed.

There is a need for improved techniques for making adjustments to BIOS setting values.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, supplemented by this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a computer-implemented method for generating a configuration database. The method comprises receiving one or more performance parameters associated with booting of a computing system having a hardware configuration. Booting of the computing system uses a BIOS. The method further comprises identifying a set of BIOS settings associated with the one or more performance parameters. The method further comprises identifying a plurality of unique combinations of the identified set of BIOS settings associated with the one or more performance parameters. The method further comprises analyzing the one or more performance parameters for each of the plurality of unique combinations to generate analysis data. The method further comprises determining a selected combination of the plurality of unique combinations based at least in part on the analysis data. The method further comprises storing the selected combination in association with the one or more performance parameters.

Embodiments of the present disclosure include a computer-implemented method comprising accessing, by a BIOS firmware of a computing system, baseboard management controller (BMC) memory. The method further comprises identifying one or more configuration payloads in the BMC memory. Each of the one or more configuration payloads contains a unique combination of BIOS setting values. The method further comprises presenting a BIOS setup utility. Presenting the BIOS setup utility includes presenting each of the one or more configuration payloads as a respective configuration preset. The method further comprises receiving a user selection for a selected configuration preset that is associated with a selected configuration payload of the one or more configuration payloads. The method further comprises implementing the selected configuration preset. Implementing the selected configuration preset includes booting the computing system using the unique combination of BIOS setting values of the selected configuration payload.

Embodiments of the present disclosure include a computing system comprising a baseboard management controller (BMC) having a BMC memory. The computing system further comprises a user input device. The computing system further comprises one or more data processors. The computing system further comprises a memory coupled to the one or more data processors. The memory has stored thereon machine readable instructions. The memory includes BIOS memory for storing a plurality of BIOS setting values. The machine readable instructions, when executed by the one or more data processors, cause the one or more data processors to perform operations. The operations include accessing the BMC memory. The operations further include identifying one or more configuration payloads in the BMC memory. Each of the one or more configuration payloads contains a unique combination of BIOS setting values. The operations further include presenting a BIOS setup utility. Presenting the BIOS setup utility includes presenting each of the one or more configuration payloads as a respective configuration preset. The operations further include receiving, via the user input device, a user selection for a selected configuration preset that is associated with a selected configuration payload of the one or more configuration payloads. The operations further include implementing the selected configuration preset. Implementing the selected configuration preset includes booting the computing system using the unique combination of BIOS setting values of the selected configuration payload.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
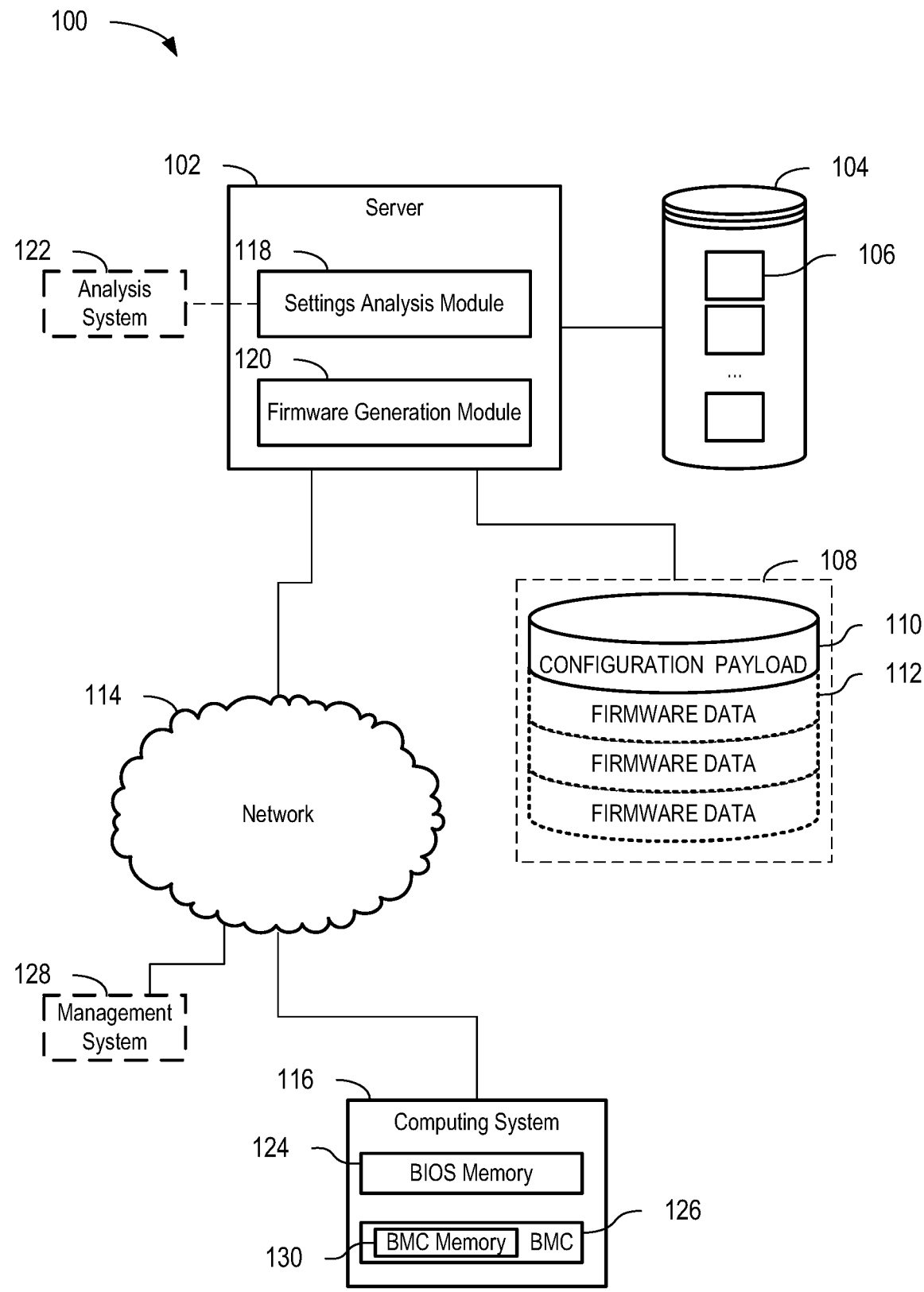
FIG. 1 is a schematic block diagram depicting a computing environment for generating, deploying, and/or using performance mode BIOS configurations, according to certain aspects of the present disclosure.

Certain aspects and features of the present disclosure relate to systems and methods for generating, distributing, and using performance mode BIOS (Basic Input/Output System) configurations. Each performance mode BIOS configuration can be a unique set of BIOS setting values that have been established to optimize a particular performance parameter or set of performance parameters, such as boot speed or operating system (OS) installation speed. Based on a given hardware configuration and/or set of performance parameters, one or more performance mode BIOS configurations can be packaged and transferred to a memory of a BMC in the form of one or more configuration payloads. The BIOS Setup Utility can display all configuration payloads, such as listed by the type of performance mode (e.g., "Boot Speed Performance Mode" and "OS Installation Performance Mode"), that are available in the BMC memory and allow a user to overwrite the memory containing the current BIOS configuration with a selected configuration payload.

As used herein, the term BIOS is inclusive of any firmware used to boot up a computing system. Thus, the term BIOS is intended to be inclusive of a UEFI firmware used to boot up a computing system. As such, a BIOS Setup Utility is intended to be inclusive of a UEFI Setup Utility, and BIOS settings are intended to be inclusive of UEFI settings.

A BIOS setting can be any adjustable setting of the BIOS firmware, such as boot order, interface settings (e.g., serial ATA settings, USB settings, etc.), power options, display settings, wake-on-LAN settings, processor settings, memory settings, and the like. Each BIOS setting can be set by storing a value for the setting. Thus, each BIOS setting can have an associated BIOS setting value that indicates how that particular BIOS setting affects the boot process. A set of BIOS settings is a collection of adjustable BIOS settings. A set of BIOS settings values is a collection of one or more values for one or more BIOS settings. A BIOS configuration includes a set of BIOS settings values. In some cases, a BIOS configuration can include a BIOS setting value for each available BIOS setting in any given BIOS firmware.

In some cases, a BIOS configuration is stored in a format that is the same as how the BIOS setting values would be stored as if they were being used on a live system. For example, on a live system, the BIOS configuration for that system (e.g., a current BIOS configuration) may be the portion of BIOS memory (e.g., a portion of non-volatile random access memory (NVRAM)) used to store the BIOS setting values. A performance mode BIOS configuration to be used on that computing system can be stored in the same fashion in BMC memory, such that it can be easily copied into the BIOS memory (e.g., NVRAM) as needed.

A BIOS can have a current BIOS configuration, which is the set of BIOS settings values that are currently saved in the BIOS memory (e.g., NVRAM). During booting of the computing system, the BIOS can access the current BIOS configuration to determine how to boot the computing system. When it is desired to change the current BIOS configuration, a BIOS Setup Utility can be launched, giving the user the option to alter individual BIOS setting values and save them to the BIOS memory (e.g., overwrite a portion of the NVRAM) as a new current BIOS configuration.

A BIOS can run on a computing system to boot the computing system. The computing system can have a particular hardware configuration. A hardware configuration can include the collection of hardware components that make up the computing system, such as the mainboard, memory, graphic processing unit(s), processor(s), peripheral devices (e.g., user input devices such as a keyboard, a mouse, and a touchscreen), networking interfaces, and others. Since BIOS requirements and performance can be dependent on a given hardware configuration, in some cases certain aspects and features of the present disclosure allow unique BIOS configurations to be created for the same performance mode across multiple, different hardware configurations.

As used herein, the term performance mode is intended to indicate a purpose or description of an associated BIOS configuration, such as an indication of the one or more performance parameters that are optimized in an associated BIOS configuration. For example, BIOS configuration designed to optimize boot speed may be identified as being a "Boot Speed Performance Mode" BIOS configuration. In such a case, the performance mode can be "Boot Speed." In another example, a BIOS configuration designed to optimize (e.g., minimize) power usage may be identified as being a "Power Saver Performance Mode" BIOS configuration. In such as case, the performance mode can be "Power Saver." Other performance modes can be used. In some cases, the performance mode may be selected to achieve a desired result rather than optimize any single or combination of performance parameters.

As used herein, the term performance parameter is intended to include any measurable (e.g., objectively measurable, or in some cases, subjectively measurable) parameter whose value is in some way dependent on one or more BIOS settings. A performance parameter can be considered optimal or optimized under various conditions, depending on the requirements of the computing system. In some cases, a performance parameter can be deemed optimal or optimized on its own, although generally, a performance parameter is determined to be optimal or optimized when being compared across different BIOS settings. In some cases, a performance parameter can be considered optimal or optimized when it meets or exceeds a predefined threshold value. In some cases, a performance parameter can be considered optimal or optimized when it reaches a maximum or minimum value (e.g., as compared to other iterations with different BIOS setting values). In some cases, a performance parameter can be considered optimal or optimized when it reaches a predefined value, falls within a predefined range adjacent a predefined value, or comes closest to the predefined value (e.g., as compared to other iterations with different BIOS settings values).

According to certain aspects of the present disclosure, a database of BIOS configurations can be generated and maintained. The database can contain entries for a number of performance modes, optionally a unique entry for each performance mode and hardware configuration combination. One or more BIOS configurations can be provided to a computing system, such as via a baseboard management controller (BMC). The BIOS configuration(s) can then be stored in the BMC memory for future use, as disclosed in further detail herein. In some cases, each BIOS configuration can be stored in the same format as it would be used in the NVRAM when used as a current BIOS configuration. Thus, the process of switching a current BIOS configuration to a performance mode BIOS configuration can involve overriding or overwriting the BIOS memory (e.g., NVRAM) with the BIOS configuration. In some cases, a performance mode BIOS configuration can include fewer than all of the BIOS settings available for any given BIOS, in which case only the BIOS settings stored in the performance mode BIOS configuration are overridden, overwritten, or otherwise updated when implementing the performance mode BIOS configuration.

The database of BIOS configurations can be pre-populated or created on-demand. Creation of a new BIOS configuration entry in the database can involve generating a BIOS configuration for a particular set of one or more performance parameters. From a set of performance parameters, BIOS settings that are known or suspected to affect any of the set of performance parameters can be identified, and unique combinations of values for those BIOS settings can be determined, thus resulting in a set of unique, possible BIOS configurations. Each of these unique, possible BIOS configurations can be tested (e.g., virtually or physically), and the resultant performance parameter(s) can be measured and analyzed to determine which of the possible BIOS configurations are considered optimal. In some cases, only a single one of the possible BIOS configurations is considered optimal. In some cases, however, multiple possible BIOS configurations can be considered optional, in which case one or more additional performance parameters can be used to differentiate the multiple optimal BIOS configurations and identify one desired BIOS configuration. Once a single optimal or desired BIOS configuration is identified, it can be stored in association with the performance parameter(s) used to generate the configuration, and in some cases, a name (e.g., a performance mode).

Testing of BIOS configurations can occur virtually or physically. Virtual testing involves simulating a boot process using a virtual machine. Physical testing involves enacting a boot process using a physical machine. In some cases, physical testing can be performed in a controlled fashion, such as when the database provider actively attempts to collect performance parameter data for a number of different BIOS configurations using their own physical machines. In some cases, however, physical testing can be performed on live systems, such as when a user operating a live system decides to alter one or more BIOS settings and collect their own performance parameter data. In such cases, the live user can opt to provide such performance parameter data and BIOS configurations to the database provider.

The various BIOS configurations suitable for a given hardware configuration can be packaged together and transferred to a computing system. In some cases, one or more BIOS configurations can be packaged together as a configuration payload, which can be included in a distribution of associated BIOS firmware. For example, a vendor distributing BIOS firmware for a set of computing systems may include a set of performance mode BIOS configurations as a binary file as a portion of the firmware image. When transferred to a BMC of the computing system, the performance mode BIOS configurations can be stored in BMC memory (e.g., memory accessible to the BMC). Thereafter, when a BIOS Setup Utility is next loaded, the BIOS Setup Utility can scan the BMC memory to identify any available performance mode BIOS configurations therein, and display each performance mode BIOS configuration as an available configuration preset. Once the user selects one of the configuration presets to use, the system can automatically override, overwrite, or copy the associated performance mode BIOS configuration into the BIOS memory (e.g., NVRAM), optionally after storing the current BIOS configurations in the BMC memory, and reboot the system. If the system fails to boot properly, the current BIOS configuration that was saved to BMC memory can be used to revert the BIOS memory to the state it was in before implementing the performance mode BIOS configuration, thus allowing the system to boot properly after a failure.

Certain aspects and features of the present disclosure further permit a user to store previously attempted and/or previously saved BIOS configurations in BMC memory in a fashion similar to that of the performance mode BIOS configurations.

Certain aspects and features of the present disclosure are especially useful at improving how computing systems function during boot procedures, by permitting users to easily switch between different optimized BIOS configurations depending on the task at hand. For example, when a user needs to install operating systems on a large number of computing devices, substantial time can be saved by loading a BIOS configuration that is optimized to minimize the time it takes to install the operating system. However, since that BIOS configuration may not be optimal for other purposes (e.g., may not optimize power usage or boot time), the user may wish to quickly select another BIOS configuration after the operating system has been installed.

Further, certain aspects and features of the present disclosure permit such optimized BIOS configurations to be systematically generated based on stated needs (e.g., performance parameters), and quickly and easily distributed. In some cases, certain aspects and features of the present disclosure can permit a computing system (e.g., a BMC of a computing system) to dynamically request BIOS configurations from a server as needed, which can facilitate always using the latest and most up-to-date performance mode BIOS configurations.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic block diagram depicting a computing environment 100 for generating, deploying, and/or using performance mode BIOS configurations, according to certain aspects of the present disclosure. The computing environment 100 includes a computing system 116, and optionally a network 114 and a server 102. As used herein, the computing system 116 and server 102 can be any suitable computing device, such as a personal home computer, a server computer, an embedded computing system, or any other computing device. The computing system 116 and server 102 can be communicatively coupled together by a network 114 (e.g., a local area network, a wide area network, the Internet, a cloud network, or the like), although that need not always be the case. In some cases, other optional computing devices, such as an analysis system 122 or a management system 128, can be used.

The computing system 116 can be a computer system of a user operating using a BIOS firmware. The computing system 116 can include BIOS memory 124 (e.g., NVRAM) usable to store the BIOS setting values for the BIOS settings. The computing system 116 can further include a BMC 126, which can be used to facilitate management of the computing system 116. The BMC 126 can have its own dedicated BMC memory 130 that is separate from the BIOS memory 124. In some alternate cases, the BMC memory 130 and the BIOS memory 124 can be logically separate locations in the same physical memory.

An optional management system 128 can be used to facilitate management of the computing system 116 via connection to the BMC 126. For example, the BMC 126 can provide a BMC User Interface via a network connection, which can be accessed by management system 128. In such cases, management system 128 may manage any number of computing systems 116, such as a server farm comprising multiple racks, each containing multiple computing systems 116 (e.g., having the same or differing hardware configurations). Management system 128 can be used to control delivery of configuration payloads 110 as disclosed herein, as well as control the BMC 126 to implement a performance mode configuration.

Server 102 can be any suitable computing device or set of computing devices. The server 102 can provide multiple modules, such as a settings analysis module 118 and a firmware generation module 120. As used herein, the term module is inclusive of a set of hardware and/or software configured to perform a certain task, such as analyzing performance parameter data or generating firmware packages.

The settings analysis module 118 can receive performance parameter data, such as from a separate analysis system 122, via a network 114, or from the server 102 itself (e.g., if the server 102 is obtaining performance parameter data by running a virtual machine). When an analysis system 122 is used, the analysis system 122 can be a physical computing device set up with a particular hardware configuration for which performance mode BIOS configurations are desired, or can be a general computing device capable of obtaining performance parameter data by running a virtual machine therein. In some cases, the settings analysis module 118 i) can help determine what different combinations of BIOS settings are used when generating different combinations of BIOS setting values (e.g., different BIOS configurations for testing); ii) can initiate capture of performance parameter data; iii) can receive captured performance parameter data; iv) can analyze the performance parameter data to determine one or more optimal BIOS configurations; v) can store the optimal BIOS configurations in a database (e.g., database 104); or vi) any combination of i-v.

Server 102 can be used to create, modify, and/or access a database 104. Database 104 can be stored in any suitable fashion, such as in memory of the server 102 or externally. The database 104 can contain a number of BIOS configuration entries 106. Each BIOS configuration entry 106 can include a performance mode BIOS configuration, and optionally any accompanying associated data such as a unique identifier, hardware configuration information associated with the performance mode BIOS configuration, performance mode information (e.g., a performance mode name or identifier) associated with the performance mode BIOS configuration, and/or performance parameter information associated with the performance mode BIOS configuration (e.g., a listing of any performance parameters optimized by the associated configuration). While described with reference to BIOS configuration entries 106, the same information can be stored in the database 104 in other fashions. For example, a single BIOS configuration can be associated with multiple different performance modes, hardware configurations, or combinations of performance mode and hardware configurations. In another example, a single performance mode may be associated with multiple possible BIOS configurations.

The server 102 can include a firmware generation module 120, which can facilitate packaging one or more BIOS configurations into a configuration payload 110, which can be delivered to the BMC 126 of a computing system 116. The configuration payload 110 can be provided on its own (e.g., via network 114 or via a removable storage device), or can be packaged into a firmware package 108. The firmware package 108 can contain the configuration payload 110 and any necessary firmware data 112. The firmware package 108 can be delivered to a BMC 126 and stored in the BMC memory 130. The configuration payload 110 can thus permit any BIOS configuration(s) packaged therein to be saved into BMC memory 130, while the firmware data 112 can be used to program and/or update the BIOS firmware (e.g., by storing code into BIOS memory 124).

In practice, a user can access a BIOS Setup Utility via the computing system 116 itself or via a separate management system 128. The BIOS Setup Utility can display the available BIOS configuration(s) present in the BMC memory 130, permitting a user to select one for use. Then, the BIOS Setup Utility can cause the selected BIOS configuration to be copied into the BIOS memory 124 (e.g., by overwriting portions of the current BIOS configuration previously stored in the BIOS memory 124), optionally after storing the current BIOS configuration into the BMC memory 130 in case there is a desire to use it again in the future. Thereafter, the computing system 116 can be restarted and then boot up using the selected BIOS configuration.

While described with certain components, computing environment 100 can, in some cases, contain additional or fewer components. Additionally, in some cases, various components of the computing environment 100 can be merged together into a combined component, or various components can be separated into multiple components, as appropriate.

Figure 2:
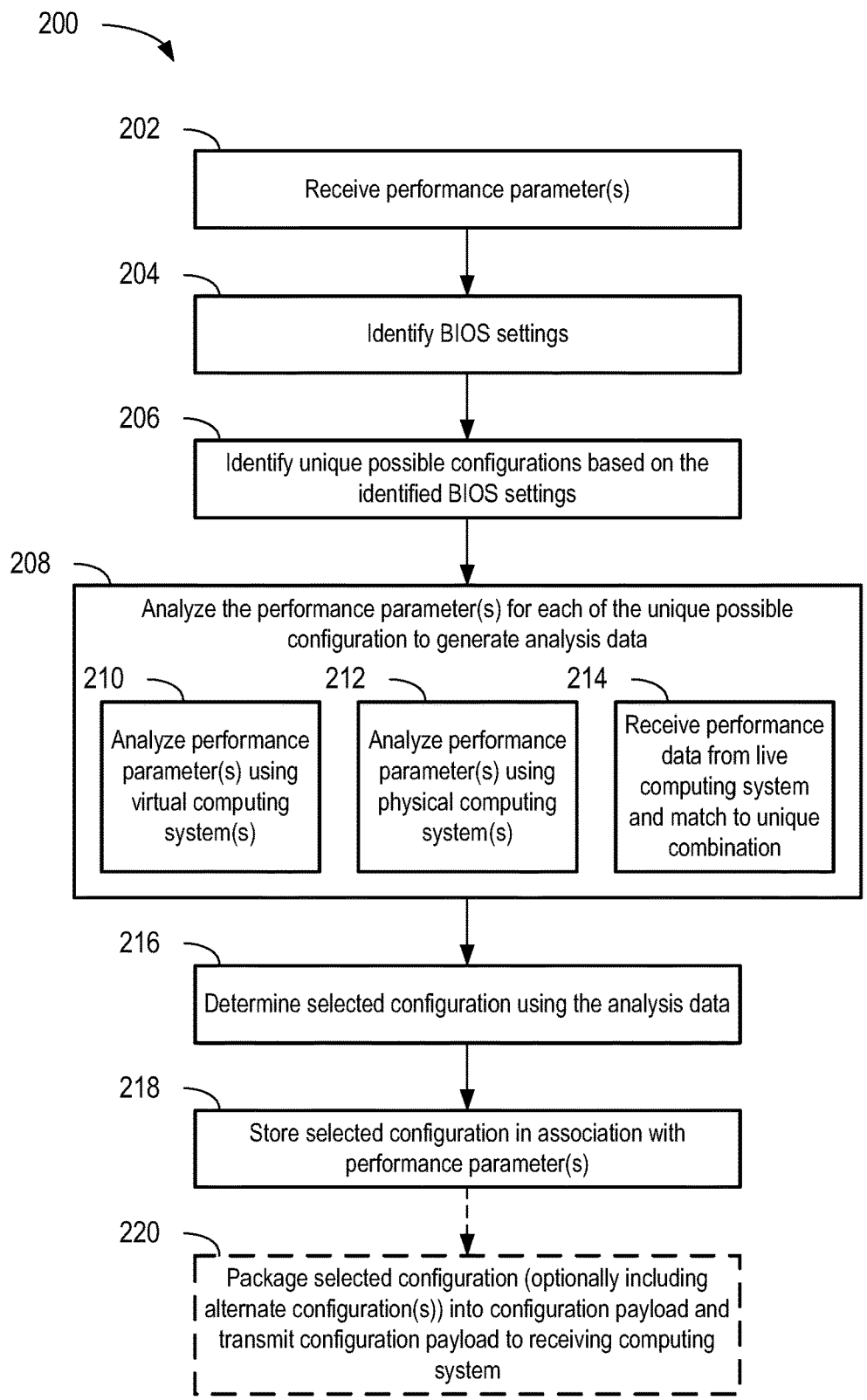
FIG. 2 is a flowchart depicting a process for generating performance mode BIOS configurations, according to certain aspects of the present disclosure.

FIG. 2 is a flowchart depicting a process 200 for generating performance mode BIOS configurations, according to certain aspects of the present disclosure. Process 200 can be performed by any suitable computing system, such as server 102 of FIG. 1.

At block 202, one or more performance parameters can be received. The received performance parameters can be a listing of one or more performance parameters that are desired to be optimized. The received performance parameters can be based on a customer's requirements, based on a supplier's desire to optimize particular parameters, or based on any other suitable information. In some cases, in addition to receiving performance parameters at block 202, a hardware configuration can be received. The hardware configuration can be a given configuration of hardware on which the BIOS to be optimized will be operating. In some cases, additional information is received at block 202, such as information of particular software to be installed by a BIOS, particular constraints to be maintained (e.g., using no more than a threshold wattage of power), or the like.

In an example, a supplier may desire to provide a performance mode BIOS configuration that maximizes the time it takes to install a particular operating system (OS), in which case the performance parameter may be a "Time to Install OS" and may be optimal when it is at a minimal value. Examples of other performance parameters include boot time, power usage, heat generation, and others.

At block 204, BIOS settings associated with the performance parameter(s) from block 202 are identified. A BIOS setting is associated with a performance parameter when changing the value of the BIOS setting can affect the performance parameter. Identifying the BIOS settings can include accessing a list of known BIOS settings that are known to be associated with the performance parameter(s). In some cases, identifying the BIOS settings can include predicting that one or more BIOS settings may affect the performance parameter. In some cases, a standard set of BIOS settings is used at block 204. In some cases, the set of BIOS settings used at block 204 can be received as part of receiving the performance parameters at block 202 (e.g., if a customer wishes to limit what settings are available to be changed when generating a performance mode BIOS configuration).

At block 206, unique possible configurations of values for the identified BIOS settings are identified. Each unique possible configuration is a set of unique BIOS setting values for the identified BIOS settings from block 204. For example, for a first BIOS setting having two possible values and a second BIOS setting having three possible values, the total number of unique possible configurations may be six. If a third BIOS setting having five possible values is also identified at block 204, the total number of unique possible configurations may be thirty. In some cases, every unique possible configuration can be identified at block 206 and used thereafter, although that need not always be the case. In some cases, only a subset of all unique possible configurations is identified and/or used.

When determining unique possible configurations of values, the number of unique possible values for a given BIOS setting may be defined by the setting itself (e.g., a binary setting may only have a true or a false value), may be a range available for the BIOS setting (e.g., a range between a lowest number and a highest number), or may be otherwise provided. In some cases, when a given BIOS setting has a large number of possible values, determining unique possible configurations of values includes selecting a subset of all possible values. For example, if a BIOS setting can have a value of any integer between 0 and 100, a subset of such a range might include the values 0, 5, 10, 15, 20, 25, 30, 35, 40, 45, 50, 55, 60, 65, 70, 75, 80, 85, 90, 95, and 100.

At block 208, the identified performance parameter(s) from block 202 are analyzed for each of the unique possible configurations identified at block 206. Analyzing a performance parameter can include obtaining a measurement of the performance parameter. For example, analyzing a performance parameter that is boot time can include calculating the time period between when the boot begins and the boot has completed. Measured performance parameters can be known as performance parameter data.

In some cases, the performance parameter(s) can be analyzed using one or more virtual computing systems (e.g., virtual machines) at block 210. One or multiple virtual computing systems can be set up to have a particular hardware and/or software configuration, allowing BIOS configurations to be tested and performance parameters to be measured.

In some cases, the performance parameter(s) can be analyzed using one or more physical computing systems at block 212. The physical computing system can have a hardware configuration appropriate for the use case. For example, when a particular hardware configuration is received at block 202, that same hardware configuration can be used to establish the physical computing system(s) used at block 212.

In some cases, the performance parameter(s) can be analyzed by receiving performance data from a live computing system at block 214. Such performance data can be collected by a live computing system, such as a computing system being operated by a customer (e.g., a customer providing the performance parameter(s) at block 202 and/or a customer using the computing system upon which the performance mode BIOS configuration is intended). Such live performance data can be received at block 214, along with information about the BIOS configuration used to generate that live performance data. Once received, the live performance data and its associated BIOS configuration can be matched to one of the unique possible configurations from block 206.

In some cases, performance parameter(s) can be analyzed for each unique possible configuration sequentially. However, in some cases, performance parameter(s) can be analyzed for multiple unique possible configurations simultaneously, such as through the use of i) one or more virtual computing systems, ii) one or more physical computing systems, iii) one or more live computing systems; or iv) any combination of i-iii. Thus, an entity desiring to provide performance mode BIOS configurations will be able to analyze more unique BIOS configurations at a quicker pace than a user attempting to manually adjust BIOS settings one at a time and measure the results on a single computing system.

The output of block 208 can be known as analysis data. The analysis data can include measured performance parameter(s) for each of the unique possible configurations from block 206, although that need not always be the case. In some cases, the analysis data can be a selection of one or more top-performing unique possible configurations based on the measured performance parameter(s).

At block 216, a selected configuration can be determined using the analysis data from block 208. Determining the selected configuration can include ranking each of the unique possible configurations from block 206 based on the measured performance parameter(s) as analyzed at block 208. Once a ranking has been established, the selected configuration can be the best-performing configuration in the ranking. For example, when boot time is the performance parameter to be optimized, the ranking of all unique possible configurations can show that a single particular configuration achieves a lower boot time than any others, in which case that particular configuration can be deemed the selected configuration. In some cases, a selected configuration can be determined at least in part based on user input (e.g., a user selecting one out of several suitable configurations). In some cases, a selected configuration can be determined at least in part based on the number and/or type of BIOS settings altered from a default BIOS configuration (e.g., out of two suitable configurations, the one that changes fewer BIOS settings may be used as the selected configuration).

At block 218, the selected configuration from block 218 is stored in association with the performance parameter(s) from block 202, such as in a database (e.g., database 104 of FIG. 1). The selected configuration can be thus stored as a performance mode BIOS configuration for a particular performance mode associated with the performance parameter(s) from block 202. Storing the selected configuration at block 218 can include storing the selected configuration in the same format as the selected configuration would appear in the NVRAM of a computing system executing the selected configuration, although that need not always be the case. Storing it in this same format, however, may facilitate subsequent implementation on the receiving computing system. In some cases, storing the selected configuration can also include storing the selected configuration in association with a hardware configuration (e.g., a hardware configuration received at block 202). In some cases, storing the selected configuration can also include determining a performance mode identifier (e.g., a name or unique identifier indicative of the performance mode, such as "Boot Time Performance Mode") and storing the selected configuration in association with that performance mode identifier.

At optional block 220, the selected configuration (e.g., the performance mode BIOS configuration) can be packaged into a configuration payload which can then be transmitted to a receiving computing system. Optionally, the configuration payload can include additional configurations other than the selected configuration. For example, a configuration payload can include i) a particular performance mode BIOS configuration; ii) alternate versions of that particular performance mode BIOS configuration (e.g., a slightly different BIOS configuration that achieves the same or similar results as the performance mode BIOS configuration); iii) other performance mode BIOS configurations (e.g., BIOS configurations for other performance modes that are different than the particular performance mode in i); or iv) any combination of i-iii. Once transmitted to the receiving computing system, the configuration payload can be stored in BMC memory. In some cases, the configuration payload is packaged into a BIOS firmware file along with BIOS code.

While described with certain blocks in a certain order, in some cases, process 200 can be performed with fewer blocks, with additional blocks, and/or with a different ordering of blocks.

Figure 3:
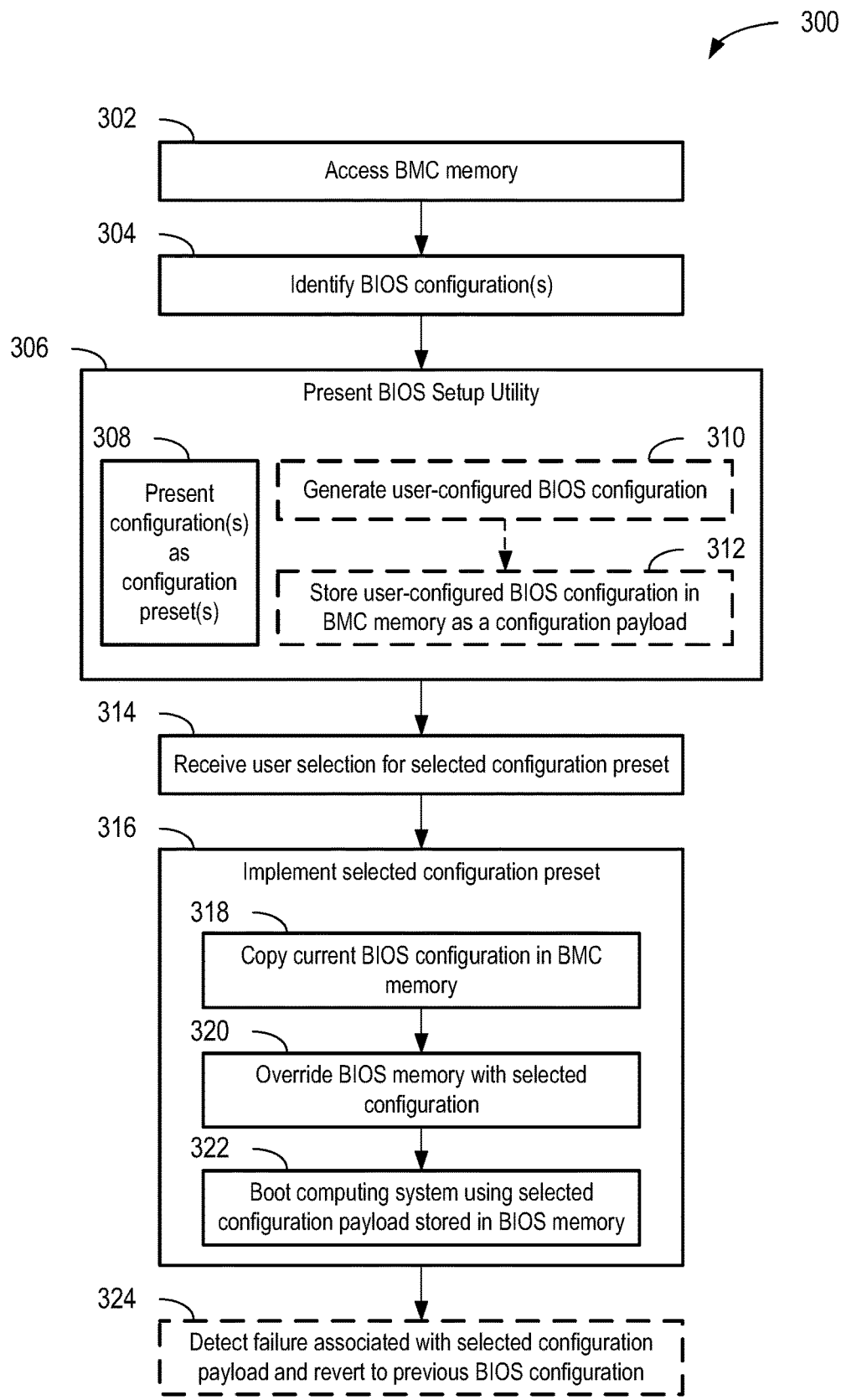
FIG. 3 is a flowchart depicting a process for displaying and implementing performance mode BIOS configurations, according to certain aspects of the present disclosure.

FIG. 3 is a flowchart depicting a process 300 for displaying and implementing performance mode BIOS configurations, according to certain aspects of the present disclosure. Process 300 can be performed by any suitable computing system, such as computing system 116 of FIG. 1 (and optionally management system 128 of FIG. 1). For example, process 300 can be performed by a BMC of a computing system, which can be accessed by that computing system or a separate management system.

At block 302, BMC memory can be accessed. At block 304, the BMC memory can be scanned to identify any BIOS configurations present therein, such as performance mode BIOS configurations or user-configured BIOS configurations (although in some cases, a user-configured BIOS configuration can be considered a performance mode BIOS configuration).

At block 306, a BIOS Setup Utility can be presented. Presenting the BIOS Setup Utility can include presenting, such as via a display device, BIOS setup options, such as BIOS settings that can be changed. As part of block 306, the configuration(s) identified at block 304 can be presented as part of the BIOS Setup Utility at block 308. The BIOS configurations can be presented as configuration presets. Presenting a BIOS configuration as a configuration preset can include i) presenting a name or other identifier associated with the BIOS configuration, ii) presenting one or more performance parameter(s) associated with the BIOS configuration, iii) presenting one or more BIOS settings and/or BIOS setting values associated with the BIOS configuration, or iv) any combination of i-iii.

In some optional cases, a user-configured BIOS configuration can be generated at block 310. Generating a user-configured BIOS configuration at block 310 can include first permitting a user to alter one or more BIOS setting values, then receiving a user input to save the then-current BIOS setting values as a user-configured BIOS configuration. In response to receiving that user input to save the user-configured BIOS configuration at block 310, the user-configured BIOS configuration can be stored in the BMC memory at block 312. The user-configured BIOS configuration can be stored similarly to how performance mode BIOS configurations are stored. In some cases, generating the user-configured BIOS configuration at block 310 can occur automatically, without specific user input to save the user-configured BIOS configuration. In such cases, whenever the user makes changes to the BIOS settings values and saves those values (e.g., to the BIOS memory) to boot the system using those values, the BIOS Setup Utility may automatically save the BIOS settings values as an automatic user-configured BIOS configuration. For example, when an automatic user-configured BIOS configuration is presented at block 308, that configuration can be presented as the configuration used at a certain date/time (e.g., "Configuration from 2021-12-01-16:03:44"). In some cases, custom names can be provided by the user and stored in association with any manually or automatically saved user-configured BIOS configurations.

At block 314, a user selection is received to select a particular configuration preset, thus selecting a particular BIOS configuration. Once selected, the selected configuration preset (e.g., selected BIOS configuration) can be implemented at block 316. Implementing the configuration preset can include adjusting the BIOS setting values to match those of the selected BIOS configuration. In some cases, adjusting the BIOS setting values specifically includes taking, from the BMC memory, the NVRAM-formatted data associated with the selected BIOS configuration, and using that data to modify the NVRAM (e.g., BIOS memory) of the computing system.

In some cases, implementing the configuration preset at block 316 can include copying the current BIOS configuration into BMC memory at block 318. Copying the current BIOS configuration into the BMC memory allows the computing system to revert to that current BIOS configuration, such as if a user manually desires to revert the BIOS setting values or if the computing system fails to properly boot. At block 320, the BIOS memory (e.g., NVRAM) can be overridden with the selected configuration. Overriding the BIOS memory with the selected configuration can include copying, overwriting, or otherwise transferring the selected BIOS configuration from the BMC memory to the BIOS memory. Then, the computing system can be booted at block 322, thus allowing the computing system to boot using the selected BIOS configuration, which is then in the BIOS memory.

In some optional cases, at block 324, a failure can be detected with the selected configuration payload. Detecting a failure can include detecting that the boot process has not completed properly (e.g., the boot process has not completed after a given timeout period, or certain necessary hardware or software elements have not been properly loaded). When the failure is detected, the BMC can automatically revert to a BIOS configuration stored in the BMC memory, such as a default BIOS configuration or a previously used BIOS configuration (e.g., the "current" BIOS configuration from block 318, which is the immediately previous BIOS configuration).

While described with certain blocks in a certain order, in some cases, process 300 can be performed with fewer blocks, with additional blocks, and/or with a different ordering of blocks. For example, in some cases, blocks 302 and 304 are performed in a single block. In another example, in some cases, blocks 302 and 304 are performed as part of block 306. In another example, process 300 may begin with a block prior to block 302, in which the BMC accesses a server to download one or more BIOS configurations, which are then saved into the BMC memory for subsequent access at blocks 302, 304.

Figure 4:
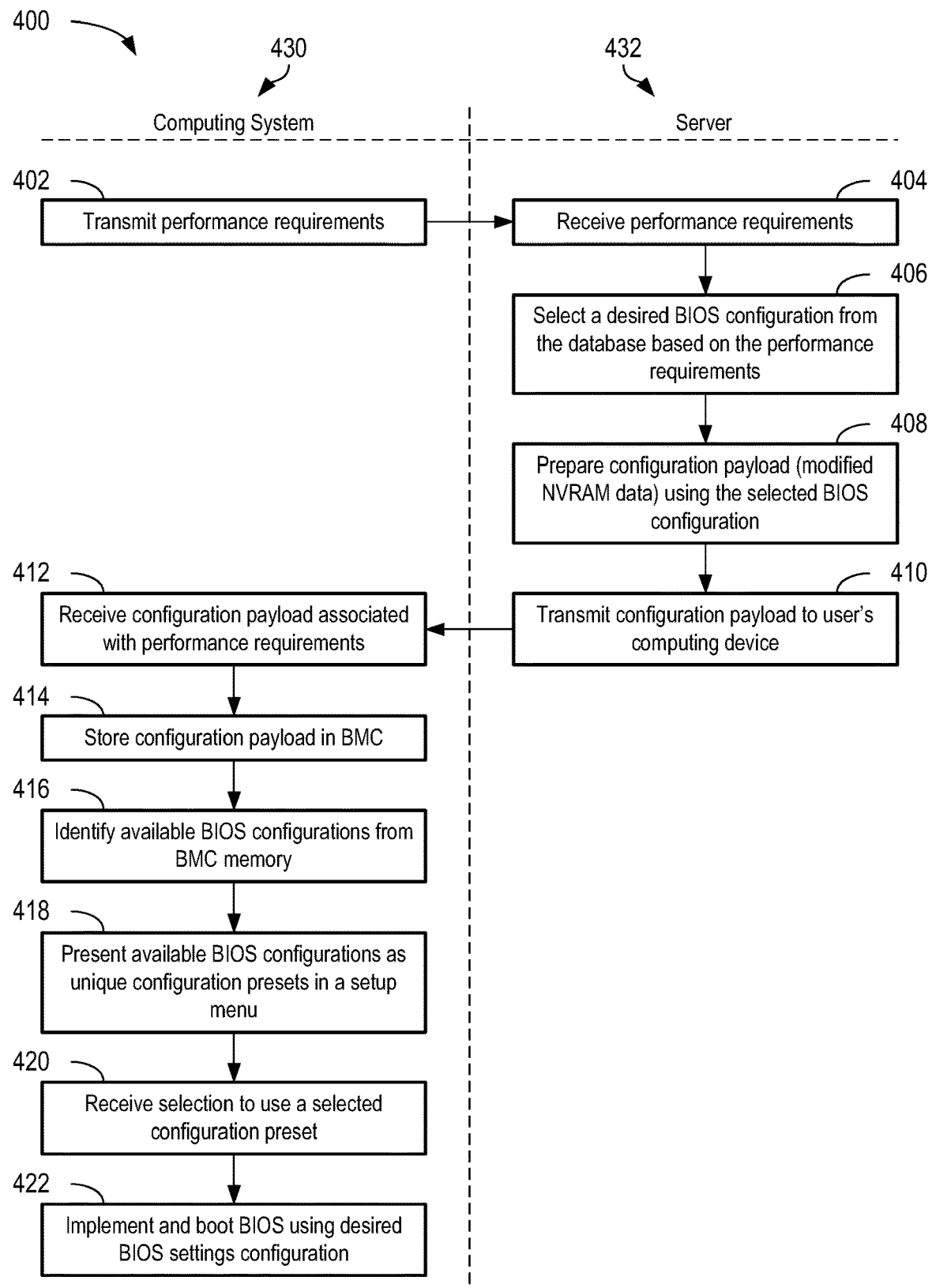
FIG. 4 is a multi-system flowchart depicting a process 400 for sharing and implementing performance mode BIOS configurations, according to certain aspects of the present disclosure.

FIG. 4 is a multi-system flowchart depicting a process 400 for sharing and implementing performance mode BIOS configurations, according to certain aspects of the present disclosure. Process 400 can be performed by any suitable computing systems, such as a computing system 430 and server 432, such as computing system 116 and server 102 of FIG. 1, respectively. While described with reference to single devices, portions of process 400 that are attributable to the computing system 430 and portions of the process 400 that are attributable to the server 432 can be performed by more than one computing system and more than one server, respectively.

At block 402, performance requirements (and optionally hardware configuration information) can be transmitted to server 432 (optionally by the computing system 430), where they are received by the server 432 at block 404. Upon receiving the performance requirements at block 404, the server 432 can proceed to select a desired BIOS configuration based on the received performance requirements (and optionally hardware configuration information) at block 406. Selecting the desired BIOS configuration can include accessing a database of performance mode BIOS configurations to find one or more BIOS configurations that fit the performance requirements (and optionally hardware configuration information) received at block 404. At block 408, the selected BIOS configuration(s) can be prepared into a configuration payload. In some cases, the configuration payload can be in the same format that the BIOS setting values would be when saved in NVRAM. In some cases, preparing the configuration payload can include combining the configuration payload with BIOS firmware. The configuration payload can be transmitted to the user's computing device at block 410, where it is received by the computing system 430 (e.g., a BMC of the computing system 430) at block 412.

At block 414, the configuration payload (e.g., the one or more selected BIOS configurations) can be stored in the BMC memory. At block 416, the BMC memory can be accessed (e.g., by a BIOS Setup Utility) to identify the available BIOS configurations, which can then be presented as unique configuration presets in a setup menu (e.g., a setup menu of a BIOS Setup Utility) at block 418. At block 420, the computing system 430 can receive a selection (e.g., via user input) to use one of the presented configuration presets. This selected configuration preset can then be implemented at block 422. Implementing the selected configuration preset at block 422 can include copying the BIOS configuration associated with the selected configuration preset into the BIOS memory and rebooting the computing system 430 to allow the BIOS to run using the new BIOS setting values from the selected BIOS configuration.

While described with certain blocks in a certain order, in some cases, process 400 can be performed with fewer blocks, with additional blocks, and/or with a different ordering of blocks.

Figure 5:
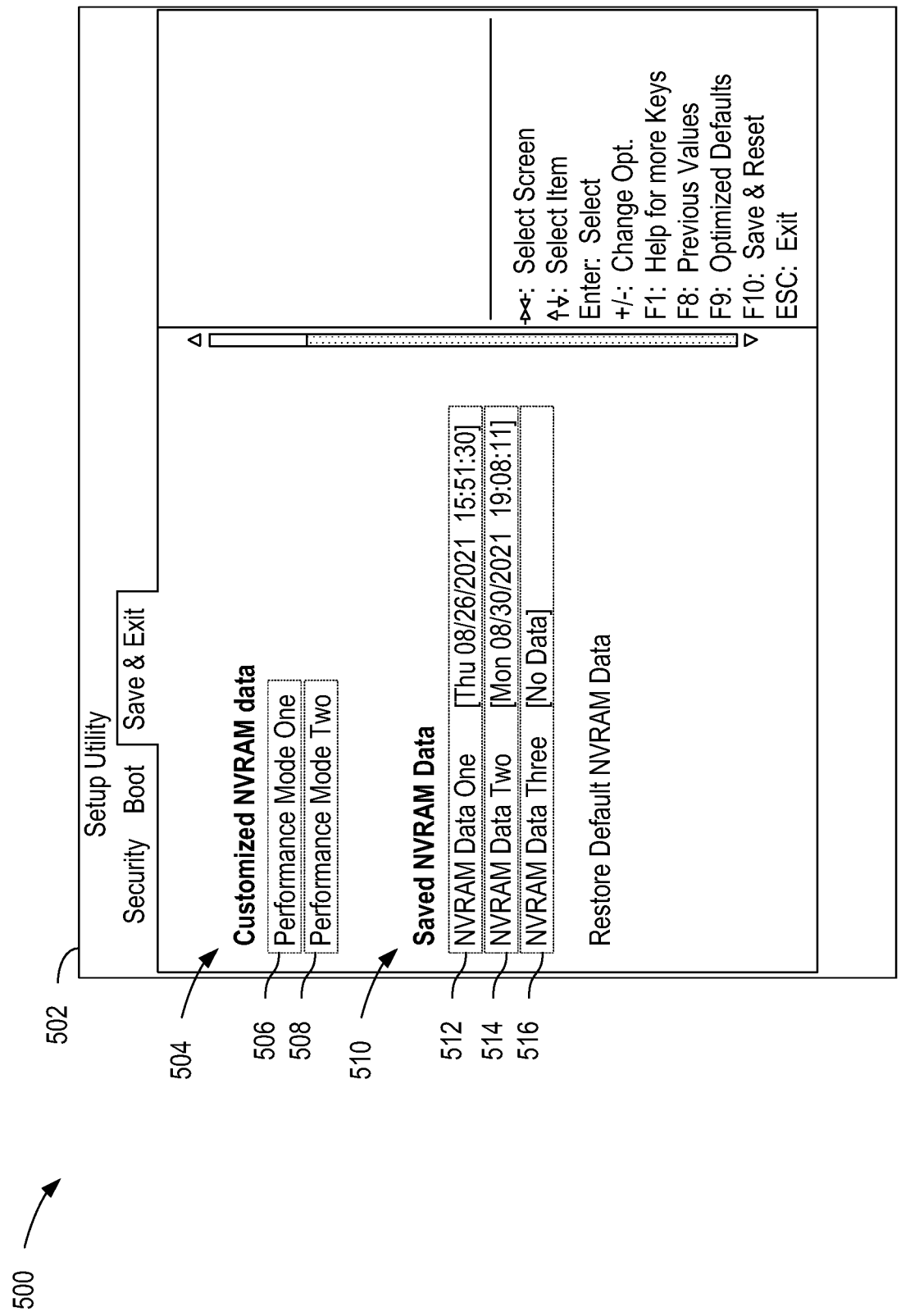
FIG. 5 is an example graphical user interface for a BIOS setup utility, according to certain aspects of the present disclosure.

FIG. 5 is an example graphical user interface (GUI) 500 for a BIOS setup utility, according to certain aspects of the present disclosure. GUI 500 can be a GUI for a BIOS Setup Utility running on a computing system, such as computing system 116 of FIG. 1.

The GUI 500 can display a BIOS Setup Utility window 502. As part of the BIOS Setup Utility window 502, the GUI 500 can present Customized NVRAM data 504 and Saved NVRAM Data 510.

The Customized NVRAM data 504 can be populated with individual performance mode BIOS configuration presets, such as Performance Mode One 506 and Performance Mode Two 508. Performance Mode One 506 can be associated with a first performance mode BIOS configuration (e.g., an "Optimized Boot Time" performance mode BIOS configuration), and the Performance Mode Two 508 can be associated with a second performance mode BIOS configuration (e.g., an "Optimized OS Install Time" performance mode BIOS configuration).

The Saved NVRAM Data 510 can be populated with previously saved user-configured BIOS configurations, such as those described with reference to blocks 310, 312 of FIG. 3. As depicted, the Saved NVRAM Data 510 includes NVRAM Data One 512, NVRAM Data Two 514, and NVRAM Data Three 516. The NVRAM Data One 512 can be a user-configured BIOS configuration that was last used on Aug. 26, 2021 at 15:51:30. The NVRAM Data Two 514 can be a user-configured BIOS configuration that was last used on Aug. 30, 2021 at 19:08:11. The NVRAM Data Three 516 can be a placeholder, which can be used by the user to store an additional user-configured BIOS configuration.

Figure 6:
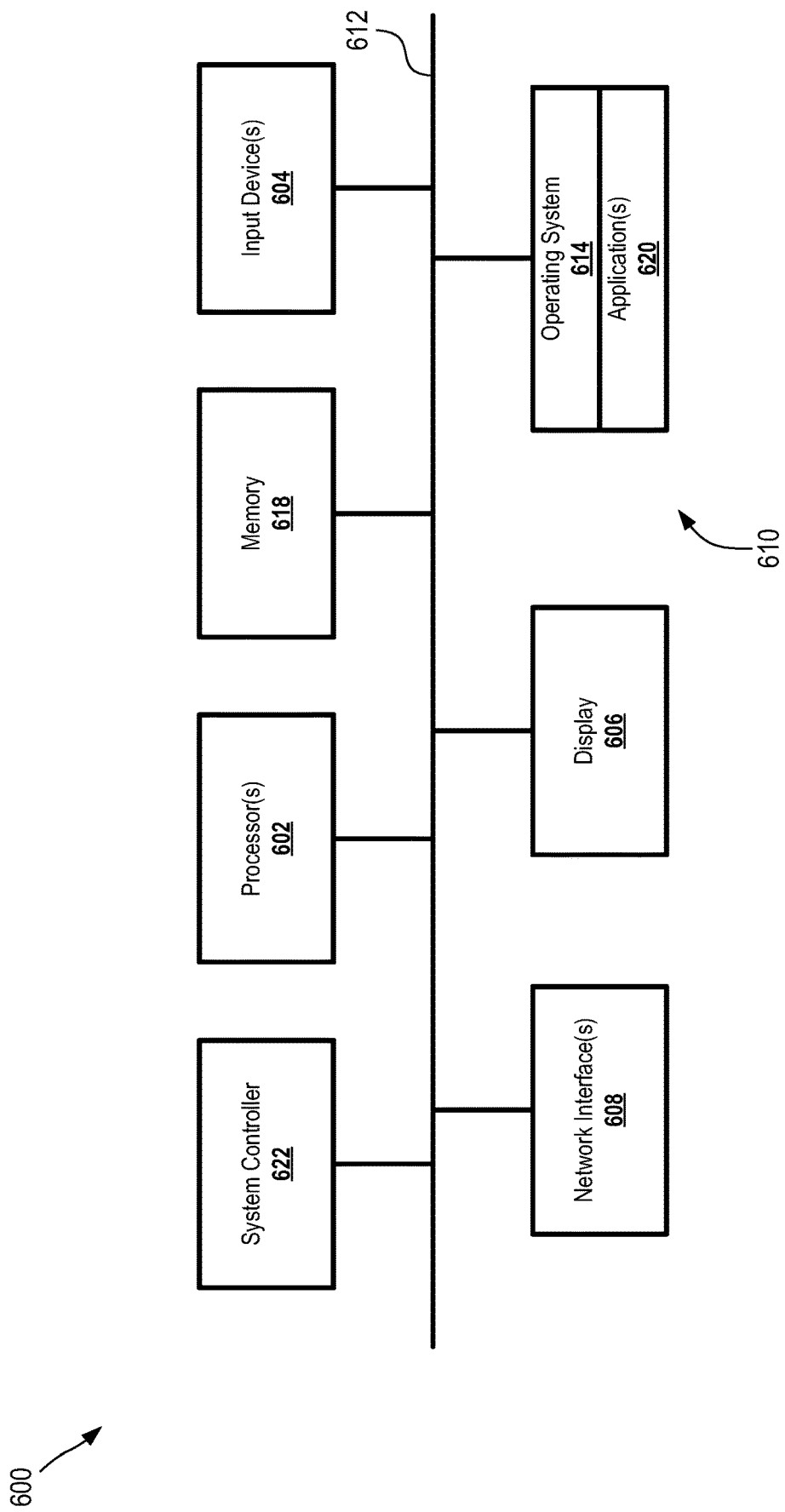
FIG. 6 is a block diagram of an example system architecture for implementing features and processes of the present disclosure.

FIG. 6 is a block diagram of an example system architecture 600 for implementing features and processes of the present disclosure, such as those presented with reference to FIGS. 2-4. The system architecture 600 can be used to implement any suitable computing device (e.g., a server, workstation, tablet, or other such device) for practicing the various features and processes of the present disclosure. The system architecture 600 can be implemented on any electronic device that runs software applications derived from compiled instructions, including without limitation personal computers, servers, smart phones, electronic tablets, game consoles, email devices, and the like. In some implementations, the system architecture 600 can include one or more processors 602, one or more input devices 604, one or more display devices 606, one or more network interfaces 608, and one or more computer-readable mediums 610. Each of these components can be coupled by bus 612.

Display device 606 can be any known display technology, including but not limited to display devices using Liquid Crystal Display (LCD) or Light Emitting Diode (LED) technology. Processor(s) 602 can use any known processor technology, including but not limited to graphics processors and multi-core processors. Input device 604 can be any known input device technology, including but not limited to a keyboard (including a virtual keyboard), mouse, track ball, and touch-sensitive pad or display. Bus 612 can be any known internal or external bus technology, including but not limited to ISA, EISA, PCI, PCI Express, NuBus, USB, Serial ATA, or FireWire.

Computer-readable medium 610 can be any medium that participates in providing instructions to processor(s) 602 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 610 can include various instructions for implementing operating system 614 and applications 620 such as computer programs. The operating system can be multi-user, multiprocessing, multitasking, multithreading, real-time and the like. The operating system 614 performs basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Computer-readable medium 610 can include various instructions for implementing firmware processes, such as a BIOS. Computer-readable medium 610 can include various instructions for implementing any of processes described herein, including at least process 200, 300, or 400 of FIG. 2, 3, or 4, respectively.

Memory 618 can include high-speed random access memory and/or non-volatile memory, such as one or more magnetic disk storage devices, one or more optical storage devices, and/or flash memory (e.g., NAND, NOR). The memory 618 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 618 can store an operating system, such as Darwin, RTXC, LINUX, UNIX, OS X, WINDOWS, or an embedded operating system such as VxWorks.

System controller 622 can be a service processor that operates independently of processor 602. In some implementations, system controller 622 can be a baseboard management controller (BMC). For example, a BMC is a specialized service processor that monitors the physical state of a computer, network server, or other hardware device using sensors and communicating with the system administrator through an independent connection. The BMC is configured on the motherboard or main circuit board of the device to be monitored. The sensors of a BMC can measure internal physical variables such as temperature, humidity, power-supply voltage, fan speeds, communications parameters, and operating system (OS) functions.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java, Python), including compiled or interpreted languages, and it can be deployed in any form, including as a stand-alone program or as a module, component, subroutine, or other units suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory, a random access memory, or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computing system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication, such as a communication network. Examples of communication networks include, e.g., a LAN, a WAN, and the computers and networks forming the Internet.

The computing system can include clients and servers. A client and server are generally remote from each other and typically interact through a network. The relationship between client and server arises by virtue of computer programs running on the respective computers and having a client-server relationship with each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, and the like.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the disclosure. Thus, the breadth and scope of the present disclosure should not be limited by any of the above described embodiments.

Although certain aspects and features of the present disclosure have been illustrated and described with respect to one or more implementations, equivalent alterations and modifications will occur or be known to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

As used herein, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

One or more elements or aspects or steps, or any portion(s) thereof, from one or more of any of claims 1 to 20 below can be combined with one or more elements or aspects or steps, or any portion(s) thereof, from one or more of any of the other claims 1 to 20 or combinations thereof, to form one or more additional implementations and/or claims of the present disclosure.

What is claimed is:

1. A computer-implemented method for generating a configuration database, comprising:
   receiving one or more performance parameters associated with booting of a computing system having a hardware configuration, wherein booting of the computing system uses a Basic Input/Output System (BIOS);
   identifying a set of BIOS settings associated with the one or more performance parameters;
   identifying a plurality of unique combinations of the identified set of BIOS settings associated with the one or more performance parameters;
   analyzing the one or more performance parameters for each of the plurality of unique combinations to generate analysis data;
   determining a selected combination of the plurality of unique combinations based at least in part on the analysis data;
   storing the selected combination in association with the one or more performance parameters, the storing including:
      determining a performance mode identifier associated with the one or more performance parameters, and
      storing the selected combination in association with the performance mode identifier;
   booting the computing system using the selected combination stored in association with the performance mode identifier.

2. The computer-implemented method of claim 1, wherein identifying the plurality of unique combinations of the identified set of BIOS settings includes identifying every unique combination of the identified set of BIOS settings.

3. The computer-implemented method of claim 1, wherein analyzing the one or more performance parameters for each of the plurality of unique combinations includes analyzing the one or more performance parameters via one or more virtual computing systems simulating the hardware configuration.

4. The computer-implemented method of claim 1, wherein analyzing the one or more performance parameters for each of the plurality of unique combinations includes analyzing the one or more performance parameters via one or more additional computing systems having the hardware configuration.

5. The computer-implemented method of claim 1, wherein analyzing the one or more performance parameters for each of the plurality of unique combinations includes:
   receiving BIOS configuration data associated with a live computing system;
   receiving performance data associated with a live computing system;
   identifying that the BIOS configuration data associated with the live computing system matches one of the plurality of unique combinations; and
   using the received performance data for the matched one of the plurality of unique combinations in response to identifying that the BIOS configuration data associated with the live computing system matches the matched one of the plurality of unique combinations.

6. The computer-implemented method of claim 1, wherein determining the selected combination from the plurality of unique combinations includes:
   ranking the plurality of unique combinations according to the generated analysis data; and
   using, as the selected combination, the unique combination of the plurality of unique combinations having the highest rank within the ranking.

7. The computer-implemented method of claim 1, wherein storing the selected combination in association with the one or more performance parameters includes storing the selected combination in association with the hardware configuration.

8. The computer-implemented method of claim 1, further comprising:
packaging the selected combination into a configuration payload; and
transmitting the configuration payload, wherein the configuration payload, when received at the computing system, causes the BIOS to present a configuration preset, which when selected, causes the BIOS to boot using the selected combination.

9. The computer-implemented method of claim 8, further comprising packaging at least one alternate combination into the configuration payload, wherein the configuration payload, when received at the computing system, further causes the BIOS to present at least one additional configuration preset, each of which, when selected, causes the BIOS to boot using a respective one of the at least one alternate combination.

10. A computer-implemented method, comprising:
accessing, by a Basic Input/Output System (BIOS) firmware of a computing system, a baseboard management controller (BMC) memory;
identifying one or more configuration payloads in the BMC memory, wherein each of the one or more configuration payloads contains a unique combination of BIOS setting values, the identifying of the one or more configuration payloads in the BMC memory including accessing a respective performance mode identifier associated with each of the one or more configuration payloads;
presenting a BIOS setup utility, wherein presenting the BIOS setup utility includes presenting each of the one or more configuration payloads as a respective configuration preset, the presenting of each of the one or more configuration payloads includes presenting the respective performance mode identifier;
receiving a user selection for a selected configuration preset associated with a selected configuration payload of the one or more configuration payloads; and
implementing the selected configuration preset, wherein implementing the selected configuration preset includes booting the computing system using the unique combination of BIOS setting values of the selected configuration payload.

11. The computer-implemented method of claim 10, further comprising loading a current BIOS configuration from BIOS memory prior to receiving the user selection, wherein implementing the selected configuration present further includes:
copying the current BIOS configuration into the BMC memory; and
overriding the current BIOS configuration in the BIOS memory with the selected configuration payload, wherein booting the computing system using the unique combination of BIOS setting values of the selected configuration payload includes booting the computing system using the selected configuration payload stored in the BIOS memory.

12. The computer-implemented method of claim 11, further comprising:
detecting a failure during booting of the computing system using the selected configuration payload stored in the BIOS memory;
overriding the selected configuration payload stored in the BIOS memory with the current BIOS configuration by copying the BIOS configuration from the BMC memory into the BIOS memory; and
booting the computing system using the current BIOS configuration that was copied into the BIOS memory from the BMC memory.

13. The computer-implemented method of claim 10, further comprising:
receiving user input indicative of one or more altered BIOS setting values;
generating a user-configured BIOS configuration based at least in part on the received user input; and
storing the user-configured BIOS configuration in the BMC memory as one of the one or more configuration payloads.

14. The computer-implemented method of claim 13, wherein presenting each of the one or more configuration payloads includes indicating any user-configured BIOS configurations as being user-configured.

15. The computer-implemented method of claim 10, further comprising:
presenting, by the BMC, a BMC user interface over a network;
receiving, via the BMC user interface, the one or more configuration payloads; and
storing the one or more configuration payloads in the BMC memory in response to receiving the one or more configuration payloads.

16. A computing system comprising:
a baseboard management controller (BMC) having a BMC memory;
a user input device;
one or more data processors; and
a memory coupled to the one or more data processors and having stored thereon machine readable instructions, the memory including Basic Input/Output System (BIOS) memory for storing a plurality of BIOS setting values, wherein the machine readable instructions, when executed by the one or more data processors, cause the one or more data processors to perform operations including:
accessing the BMC memory;
identifying one or more configuration payloads in the BMC memory, wherein each of the one or more configuration payloads contains a unique combination of BIOS setting values;
presenting a BIOS setup utility, wherein presenting the BIOS setup utility includes presenting each of the one or more configuration payloads as a respective configuration preset;
receiving, via the user input device, a user selection for a selected configuration preset associated with a selected configuration payload of the one or more configuration payloads;
loading a current BIOS configuration from the BIOS memory prior to receiving the user selection;
implementing the selected configuration preset, wherein implementing the selected configuration preset includes
booting the computing system using the unique combination of BIOS setting values of the selected configuration payload,
copying the current BIOS configuration into the BMC memory, and
overriding the current BIOS configuration in the BIOS memory with the selected configuration payload, wherein booting the computing system using the unique combination of BIOS setting values of the selected configuration payload includes booting the computing system using the selected configuration payload stored in the BIOS memory.

17. The computing system of claim 16, wherein the operations further comprise:
   receiving, via the user input device, user input indicative of one or more altered BIOS setting values;
   generating a user-configured BIOS configuration based at least in part on the received user input; and
   storing the user-configured BIOS configuration in the BMC memory as one of the one or more configuration payloads.

* * * * *